United States Patent Office 2,798,084
Patented July 2, 1957

2,798,084
RECOVERY OF URANIUM FROM AQUEOUS SOLUTIONS

Robert H. Poirier, Columbus, Ohio, assignor to the United States of America as represented by the United States Atomic Energy Commission No Drawing. Application October 14, 1952, Serial No. 314,737

3 Claims. (Cl. 260—429.1)

The present invention relates to a process for recovery of uranium values from aqueous solutions and particularly from aqueous solutions containing said metal values in relatively small concentrations.

The present invention specifically relates to the recovery of uranium values from dilute aqueous solutions obtained by leaching low-grade ores, such as shale and phosphate rock, wherein the uranium content varies from 0.0055% to 0.009%. Recovery of uranium values from leach solutions obtained from these low-grade ore materials is complicated by the presence of substantial quantities of extraneous metal values which interfere with the separation of uranium values therefrom. For example, the pH value of phosphoric acid leach solutions obtained by leaching phosphate rock is usually 2.7; only 58% of the small quantity of uranium present in low-grade ores is usually dissolved, and the leach solutions obtained contain, for instance, about 258 mg. of uranium per liter; this uranium is associated with other ingredients which, however, are by far predominant. One typical example of a shale leach solution contained, per 1 part by weight of uranium, 66 parts of iron, 29 parts of aluminum, 3 parts of silicon and 16 parts of $P_2O_5$.

It is an object of the instant invention to provide a process whereby uranium values can be recovered from strongly acidic solutions without the necessity for neutralizing a large part of the acidity and thereby effecting substantial dilution and further contamination of the original material to be treated.

It is a further object of this invention to provide a reagent useful for the selective recovery of uranium values from aqueous solutions containing relatively large proportions of extraneous metal values.

It is a further object of this invention to provide a class of reagents for recovery of uranium which is economical in that the reagent can be readily regenerated for re-use.

Other objects and advantages in the instant invention will be apparent upon further examination of the specification.

I have discovered that long-chain amidine compounds which correspond to the general formula

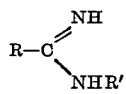

are well adapted for use as precipitants for uranium values from strongly acidic aqueous solutions; in this general formula R denotes an alkyl having at least six carbon atoms, an aryl, alkaryl (e. g. $CH_3-C_6H_4-$), or aralkyl (e. g. $CH_3CH(C_6H_5)-$) radical and R' may be an alkyl or aryl radical or hydrogen. Lauramidine,

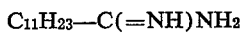

and lauryl-lauramidine,

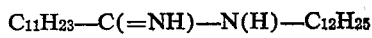

are the preferred compounds of this class for the selective precipitation of uranium values from strongly acidic solutions containing sulfate and phosphate anions in proportions relatively larger than the proportion of the uranium values contained therein.

The pH range of the solution to be treated suitably ranges from 0.5 to 2.5, but a pH of about 2.45 is preferred.

The long-chain alkyl amidine precipitants for uranium are introduced into the aqueous solution either as the amidine or as a strong inorganic acid salt thereof, such as lauryl amidinium hydrochloride, e. g.

or the lauryl amidinium phosphate,

A quantity of amidine is preferably employed which corresponds to an excess of from 5 to 10 moles.

The process of this invention is satisfactory also when employed for phosphate- or iron-containing solutions. The following example will further illustrate utility of this class of compounds for precipitation of uranium.

Example

Synthetic leach solutions were prepared by adding uranium as an aqueous stock solution of uranyl nitrate or sulfate to buffered solutions obtained by dissolving monocalcium phosphate monohydrate in 85% phosphoric acid so as to yield solutions having pH values of about 0.5, 1.5 and 2.5. About 0.31 mole per liter of the monocalcium phosphate were added to each solution which contained, respectively, 2.45 moles per liter phosphoric acid, 0.58 mole per liter phosphoric acid, and 0.09 mole per liter phosphoric acid in order to obtain the desired pH values.

To 500 ml. each of aqueous solutions containing 78.5 g. of monocalcium phosphate monohydrate per liter, 50 mg. of uranium or uranyl nitrate, and varying quantities of phosphoric acid to yield pH values of 0.5, 1.5 and 2.5, respectively, an aqueous solution of an amidine salt was added as indicated in the table below. After stirring for 15 minutes, the precipitates formed were filtered off; the filtrates were analyzed for their uranium contents to determine the quantity of uranium precipitated. The results are summarized in the following table.

| Amidine Hydrochloride | Wt. of Prec. per 100 mg. of uranium, g. | Uranium Precipitated, percent | | |
|---|---|---|---|---|
| | | pH of solution | | |
| | | 0.5 | 1.5 | 2.5 |
| Lauramidine | 0.5 | 15 | 20 | 75 |
| Lauryl-lauramidine, $C_{11}H_{23}C(=NH)-N(H)-C_{12}H_{25}$ | 0.85 | 5 | 5 | 85 |
| Phenyl-lauramidine, $C_{11}H_{23}C(=NH)-N(H)-C_6H_5$ | 0.65 | 5 | 5 | 15 |

These experiments show that a pH value of about 2.5 yields the best results.

The foregoing example is intended to be illustrative rather than limiting in scope. It will also be understood that the invention is susceptible to various modifications and changes which fall within the scope of the appended claims.

What is claimed is:

1. A process for recovering uranium from aqueous solutions which comprises adjusting the pH value of said solutions to about 2.5, adding a long-chain amidine to said solutions whereby said uranium values are precipitated, and separating the precipitate from the aqueous supernatant, said long-chain amidine having the general formula

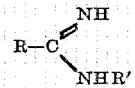

wherein R denotes a radical selected from the group consisting of alkyl having at least six carbon atoms, aryl, alkaryl and aralkyl radicals, and R' is selected from the group consisting of alkyl radical, aryl radical and hydrogen.

2. The process of claim 1 wherein said amidine is the N-lauryl lauramidine.

3. A process for recovering uranium from aqueous solutions which comprises adjusting the pH value of said solutions to between 0.5 and 2.5, adding lauramidine, $C_{11}H_{23}$—$C(=NH)$—$NH_2$, to said solutions whereby said uranium values are precipitated, and separating the precipitate from the aqueous supernatant.

References Cited in the file of this patent
UNITED STATES PATENTS
2,220,042    Hill _____ Oct. 29, 1940